INVENTORS
EDWARD K. KAPRELIAN
SIDNEY SCHWARTZ
BY
ATTORNEYS

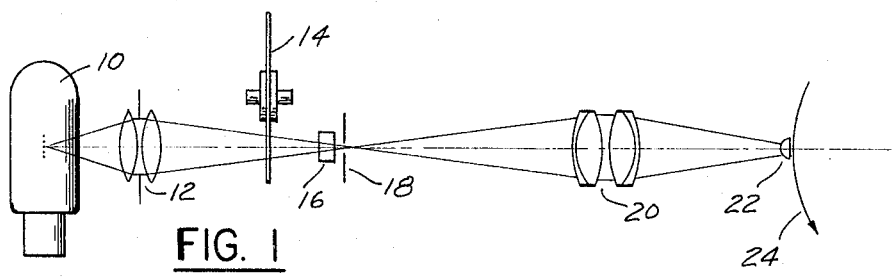
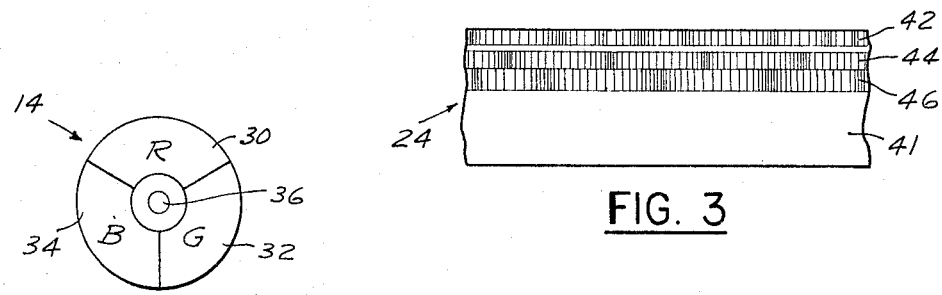
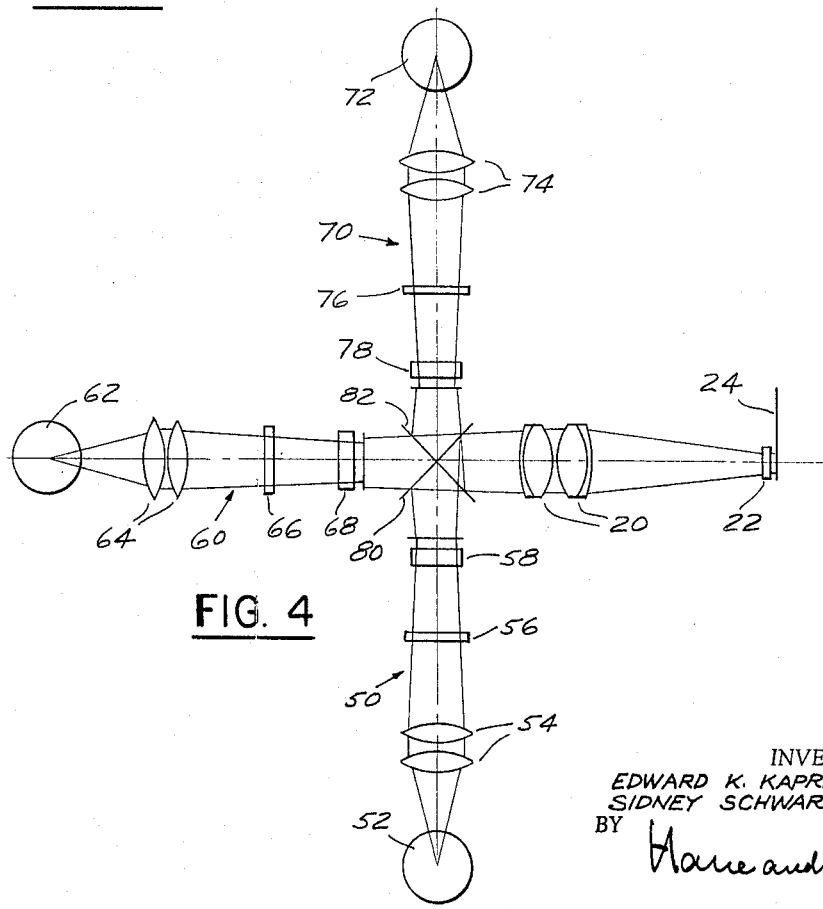

Oct. 25, 1966

E. K. KAPRELIAN ET AL 3,281,151
METHOD OF AND DEVICE FOR RECORDING AND REPRODUCING
PHOTOGRAPHIC SOUND PATTERNS

Filed May 9, 1963

INVENTORS
EDWARD K KAPRELIAN
SIDNEY SCHWARTZ
BY
Hane and Nydick
ATTORNEYS

3,281,151
METHOD OF AND DEVICE FOR RECORDING AND REPRODUCING PHOTOGRAPHIC SOUND PATTERNS
Edward K. Kaprelian, Joppa, Md., and Sidney Schwartz, Plainville, Conn., assignors to The Kalart Company Inc., Plainville, Conn., a corporation of New York
Filed May 9, 1963, Ser. No. 279,117
3 Claims. (Cl. 274—5)

The present invention relates to a method of and a device for recording sound patterns in the form of photographic images and also to a method of and a device for audibly reproducing such sound patterns.

The use of sound patterns to accompany pictures, either still pictures such as photographic pictures or motion picture sequences, for purpose of explanation or emphasis has become increasingly important in many activities such as training, education, entertainment, sales, advertising, propaganda and in the evolution of teaching machines in general.

In many instances it is desirable or necessary to associate with the pictorial representation a rather lengthy audible message, and it is often desirable or necessary that the message which can be audibly reproduced from the sound pattern has greater flexibility than is obtainable with optically recorded sound patterns as heretofore known.

With conventional optically recorded sound patterns, whether associated with still pictures or motion picture frames, the area occupied by the sound pattern on its carrier is a direct function of the total length of the message. As a result the carrier required for a lengthy message becomes unduly large and correspondingly expensive.

It is a broad object of the invention to provide a novel and improved method of and a device for optically recording a sound pattern which method and device afford the advantage that the length of the message which can be accommodated on a given area of the carrier of the pattern is much greater than heretofore possible.

Another broad object of the invention is to provide a novel and improved method of and device for optically recording a sound pattern in several predetermined sections which can be reproduced to present a continuous audible message, or independently in a selected order, or several selected sections may be simultaneously reproduced. Such highly diversified use of a sound pattern permits uses of the pattern that heretofore were not conveniently, or not at all possible. The pattern may be used for instance for the teaching of languages by recording on one section the native language of a student, on a second section a foreign language being learned and on a third section information as to the phonetic and grammatical peculiarities of the foreign language and other information that may be useful. Questions in any field of learning may be recorded on one section, the answer on another section and explanatory information on a third section. A different language may be recorded on each section to accompany a motion picture film. Members of a multiple language audience may then hear the audible message in a language known to them by using separate head sets. Dialogue, music and background sounds may be recorded on different sections for selective reproduction. For teaching and appreciation of music, wind, string and percussion instruments may be recorded on different sections. A student may for instance play the violin while the recordings of the wind and percussion instruments only are played back so that the student in effect plays as part of an orchestra. Many other uses of the aforedescribed sectional patterns are readily apparent.

A more specific object of the invention is to provide a device for recording a sectionalized sound pattern on several superimposed layers of a multi-layer carrier in a manner such that the recording on each layer may be selectively and independently played back.

Another more specific object of the invention is to provide a novel and improved device for recording sectionalized sound patterns as hereinbefore described by utilizing the capability of color film to record on the several color layers of such film by means of suitable color filters sections of the sound pattern so that each of the colored pattern sections thus obtained is complete and independent from other colored sound pattern sections recorded on the same area of the film. Assuming by way of example that the color film has three layers and that a sound pattern is recorded on each layer, it is evident that the total length of the available track is triple the length of a sound track which may be optically recorded on the same area of the film by conventional means. The pattern on each layer may be arranged in any desired and suitable array. A particularly advantageous arrangement is to record the pattern in the form of an array of parallel track portions in which the end of one track portion and the beginning of the next adjacent track constitute a continuation of the recorded message so that playback of track portions in sequential order produces a continuing message. To preserve continuity at the full level of the sound reproduction during the transition of the scanning from one track portion to the next adjacent one, complementary fade-out and fade-in parts may be provided at the end and the beginning respectively of each two adjacent track sections. Sound track patterns of this kind are fully described and shown for instance in prior U.S. Patent 3,046,836.

Still another more specific object of the invention is to provide a method of and a device for audibly reproducing sound patterns of the general kind above referred to in which the information recorded on the several colored sound tracks is scanned independently and selectively by means of suitable color filters interposed in the scanning light beams. The modulated light signals thus obtained from the several layers may then be amplified and audibly reproduced separately in a conventional manner.

In the event the superimposed sound patterns are associated with still pictures on a strip of film as known under the trademark "Soundstrip" in the aforementioned pattern, such strips of film may be visually and audibly reproduced by a sound projector of the kind described for instance in prior U.S. Patent 2,925,753.

Still another object of the invention, allied with the preceding ones is to provide a method of and means for encrypting the message to be recorded in the form of sound patterns on several superimposed layers of a carrier such as the several layers of a color film so as to prevent unauthorized access to the massage, and also to provide a method of and a means for decoding such encrypted message.

Other and further objects, features and advantages of the invention will be pointed out hereinafter and set forth in the appended claims constituting part of the application. In the accompanying drawing several preferred embodiments of the invention are shown by way of illustration.

In the drawing:

FIG. 1 shows the optical schematic of a single head variable density modulator for recording sound on film.

FIG. 2 shows a color filter for use in the modulator of FIG. 1.

FIG. 3 shows in cross-section a portion of superimposed sound track produced on color film.

FIG. 4 shows a triple head modulator for simultaneously recording three superimposed sound tracks.

Figure 5:
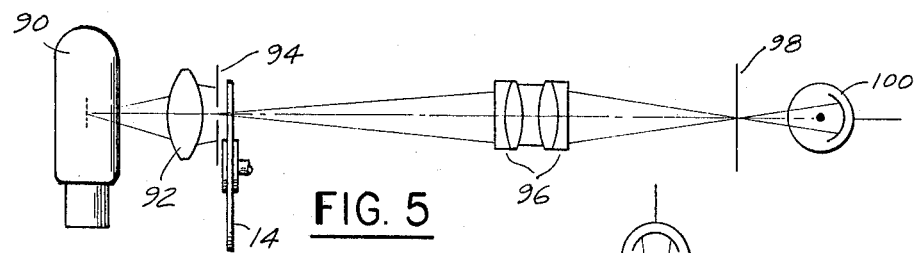
FIG. 5 shows the optical schematic for a single head sound reproducer.

The invention is exemplified in application to color film having several superimposed layers each responsive to a different color, but the concept of the invention is not limited to such application. Referring now to the figures in detail, the modulator of FIG. 1 is provided with a recording lamp 10, the filament of which is focused by condensers 12 through a filter 14, to be described, past the usual end mask and septum 16 onto the slit of a conventitonal light valve 18. The signal to be recorded is amplified and fed to the ribbons of the light valve resulting in their movement and the ensuing modulation of light in a manner well known in the art. Lens system 20 receives the light passing through valve 18 and condenses the light onto cylindrical lens 22 which in turn focuses the image of the slit onto color film 24 whereon a variable density sound track is recorded. Although a variable density recorder has been used as an illustration, it should be understood that a variable area recorder could be used if desired, and that other light valves, conventional or non-conventional, such as those employing an oscillating mirror are equally suitable.

FIG. 2 shows filter 14 to comprise three color segments 30, 32 and 34 which are preferably red, green and blue respectively. The filter is provided with a shaft 36 about which it can be revolved manually, mechanically by such means as gears or cams, or electromechanically such as by a solenoid or motor not shown.

In operation the modulator-recorder first records a message on film 24 through one segment of the filter, for example blue segment 34. The film is then rewound to the starting point and a second message, or a continuation of the original message is recorded through another segment of filter 14, for example green segment 32. The process is repeated with the remaining red segment. Upon development of the film, three superimposed independent sound tracks, one red, one green and one blue will result in the same sound track area on the film.

FIG. 3 shows the appearance of the resultant multiple sound track in vertical cross section. Film 24 comprises a support 41 on which are a yellow layer 42, a magenta layer 44, a cyan layer 46 corresponding to the original blue, green and red sensitive emulsion layers, respectively. When audibly reproduced by means of the sound reproducer head to be described, each of the red, blue and green sound tracks will be reproduced separately when utilizing a filter the color of which corresponds to that of the respective sound track.

It is frequently desirable and convenient to record two or three sound tracks simultaneously, particularly when the respective messages have been prerecorded on magnetic or other media. By employing the three-headed recorder shown in FIG. 4 such recording can be accomplished during a single pass through the recorder. In this modification three separate modulators, shown in plan view generally as 50, 60 and 70, receive three separate messages which are modulated in different colors and combined on the film. Lamps 52, 62 and 72 illuminate condensers 54, 64 and 74 respectively which pass light through red filter 56, green filter 66 and blue filter 76 respectively onto light valve assemblies 58, 68 and 78 respectively.

Modulated red light from modulator 50 is reflected by semi-transparent mirror or dichroic beam splitter 80 through achromatic lens system 20 onto cylindrical lens 22 which forms the red sound track on film 24. Light from blue modulator 70 is reflected by semi-transparent mirror or dichroic beam splitter 82 onto the film, in the same manner as just described, to form the blue sound track. Green light from modulator 60 passes through the two crossed beam splitters to form the green sound track.

Obviously it is possible to record more than three sound tracks on a given area in accordance with this invention provided suitable recording media and filters are available. Conversely, only two tracks need be utilized for stereophonic recording and reproduction, the additional track or tracks being left blank, or used for cueing or control.

FIG. 5 is the optical schematic, in elevation, of a single head reproducer for reproducing each of the color sound tracks singly. A condenser 92 receives light from a lamp 90 and illuminates a slit 94, light from which passes through a filter 14 identical to that shown in FIG. 2, to a well corrected achromatic objective lens 96. Achromatic lens 96 images a slit 94, preferably at a reduced magnification, onto the sound track area of color film 98. The modulated light from the sound track is received by a photocell 100, converted into an electrical signal, amplified and fed to a speaker, not shown, in a manner well known in the art. The film may move past the light slit image as in conventional sound motion pictures, or the sound track area may be held stationary and the light slit image moved along the length of the sound track area.

If the three sound tracks are to represent a continuous message which has triple the length of message normally recorded on a given length of track, it is necessary that the rotation of the filter from one color segment to the next be achieved rapidly. In this case a cam and a lever, a pawl, or other mechanical expedient can be employed, preferably synchronized in timing with the projector mechanism to effect rapid shifting of the filter. If the three sound tracks represent separate messages, as in a question and answer portion of a teaching machine or in the case of multiple language tracks, the color filter change and hence the shift from one track to another may be a programmed action depending upon a response on the part of the student or the audience, or one which is automatically timed, or one which functions manually as desired.

Figure 6:
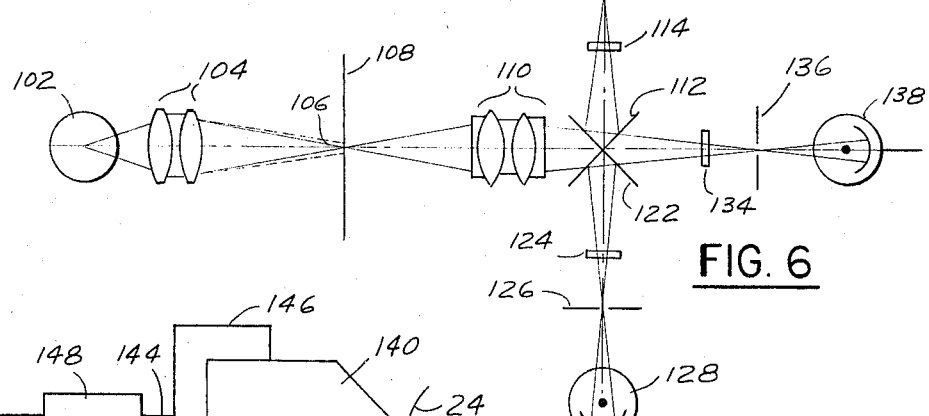
FIG. 6 shows the optical schematic for a triple head sound reproducer.

When two or more tracks are to be reproduced simultaneously, a triple head reproducer shown in FIG. 6 may be employed. Here, the image of the filament of a lamp 102 is formed by a lens 104 on a sound track area 106 of a film 108. The illuminated sound track is imaged by a lens 110 on each of three sound slits 116, 126 and 136 in the following manner. A portion of the light from lens 110 is reflected by a beam splitter or dichroic mirror 112 through a red filter 114 onto slit 116 and to a red track photocell 118. Another portion of the light is reflected by a beam splitter or dichroic mirror 122 through a blue filter 124 onto slit 126 and to a blue track cell 128. A third portion passes through the crossed beam splitters, through a green filter 134, onto slit 136 to a green track cell 138. The outputs of cells 118, 128 and 138 are separately amplified and reproduced for any of the purposes to which multiple sound tracks are applicable.

If filter 14 of FIG. 1 is rotated a number of times during the recording of a message, bits of the message will be found in each of the three color layers, distributed physically and chronologically in accordance with the rotational rate of the filter. If two other messages are recorded in similar fashion to utilize all three tracks without overlap, normal playback of the sound track through any one color filter will produce a confusing audible reproduction of unconnected message bits; and if the rotational rate of the filter is sufficiently high, for instance above 5 times per second, the reproduction is unintelligible and meaningless, or in other words, the message is scrambled or encrypted.

The degree of encryption just described is increased if (1) the frequency of the color shift is made variable, (2) the percentage of time sharing of the colors is made variable, (3) the number of color tracks is increased and (4) if variables (1) and (2) are made random within practical limits. Under these circumstances deciphering or unscrambling of a message becomes quite difficult particularly when there is a basic similarity in the construction of the three messages, as for example when spoken in a monotone by one person, or when composed solely of a recitation of numbers, or in the extreme case, when in ordinary digitalized form. Deciphering requires a precise knowledge of the modulation changes, and can be achieved readily if the modulation changes are recorded as a code on magnetic tape, film or other medial and used to control the color filtering at the reproducer.

Figure 7:
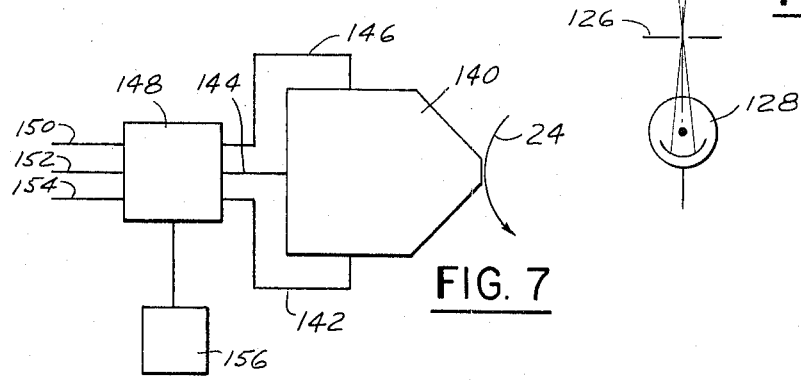
FIG. 7 shows schematically a modification of a recorder including an encoding assembly.

FIG. 7 shows diagrammatically the elements of an encoding multiple track recorder. A triple head recorder 140 similar to that shown in FIG. 4 receives three message inputs through cables 142, 144 and 146 connected for example to the red, green and blue modulators respectively for recording onto film 24. A multiple pole switch 148 connects to cables 142, 144 and 146 and also to three independent sets of messages carried on cables 150, 152 and 154. A programmer 156 causes the switch to shift its output so that each message successively shares a portion of each color track.

Figure 8:
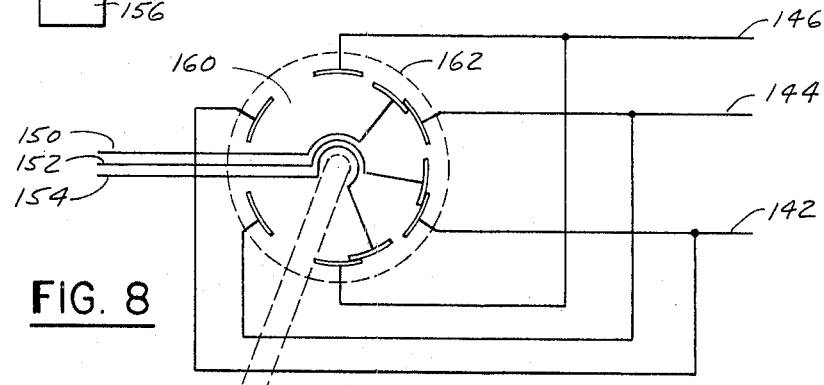
FIG. 8 shows diagrammatically the switching arrangement used in the encoding assembly of FIG. 7.

FIG. 8 shows diagrammatically how switch 148 functions. A three contact rotor 160 driven through shaft 159 by a motor or other controlled driving means 158, has a contact connected to each of message signals 150, 152 and 154 through slip rings, not shown. A six contact stator 162, with opposite contacts connected, has successive contacts connected to blue, red and green channel cables 142, 144 and 146 respectively. In the switch position shown in FIG. 8, the signals on cables 150, 152 and 154 are being recorded on green channel 144, blue channel 142 and red channel 146 respectively. A programmer 156, which may employ magnetic tape, punched cards, punched tape or other code memory medium, determines the switching rate and the time of dwell at each station.

Although mechanical switching of the type shown in FIG. 8 may be employed in simpler applications, equivalent electronic switching utilizing vacuum tubes or transistors may be preferable, particularly at high switching speeds, because of the absence of moving or wearing parts and because of the virtual elimination of electrical noise.

Figure 9:
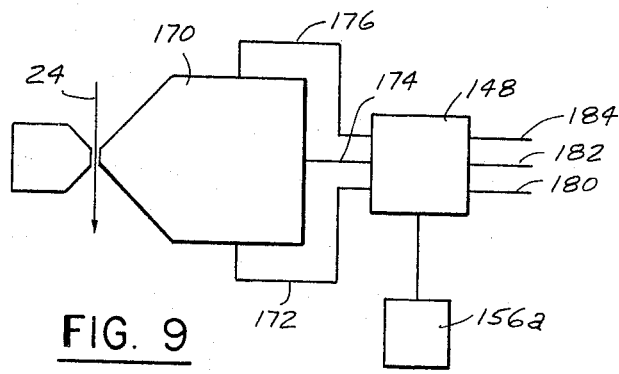
FIG. 9 shows schematically a reproducer including a decoding assembly.

Decoding of the sound track is achieved by means of the decoding reproducer shown in FIG. 9. Film 24 is fed through a triple head reproducer 170 which is similar to the reproducer shown in FIG. 6. The blue, green and red track outputs are fed through cables 172, 174 and 176 respectively into a decoding switch 148 similar to that employed in FIGS. 7 and 8. Programmer 156a provided with the proper decoding information referred to in connection with FIGS. 7 and 8, controls switch 148 in a manner so as to reconstitute the three messages on output cables 180, 182 and 184.

Encoded messages for teaching machines need not be highly secure and it is adequate in many applications merely to rotate the filter of FIG. 5 at some synchronous speed, preferably a sub-multiple of ordinary 60 cycle per second alternating current. The student, after studying the text or illustration of the accompanying picture, will press an answer button. Depending upon his selection one or the other of the color tracks previously unavailable to him reproduces the required training message, reinforcing a correct answer or providing additional instruction if the answer is incorrect. In order for the sound tracks to be secure against unauthorized access, it is necessary of course that all tracks be occupied with signals, including any unused tracks, thereby to protectively mask the true message or messages.

Other applications, including analogous use in communications systems by employing three or more separate wavebands, will suggest themselves to those skilled in the art.

Figure 10:
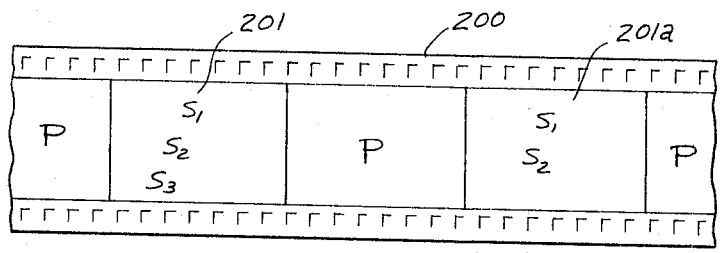
FIG. 10 is a diagrammatic view of a strip of film bearing still pictures and superimposed sound patterns according to the invention.

FIG. 10 shows a strip of film 200 on which are printed several picture areas P. Each of the picture areas is associated with a sound pattern area 201, 201a. ... Each sound pattern area may have recorded thereon several superimposed sound track sections. There are shown by way of example three sound tracks sections, S1, S2 and S3, for sound track area 201 and two superimposed sound track sections S1 and S2 for sound track area 201a. As previously explained, the several superimposed sound track sections may be audibly reproduced in a selected order or simultaneously. The recordings may be in the form of parallel track sections, see Patent 3,046,836. As also previously stated, each picture area is associated with a sound track area, but this area need not be directly adjacent to the respective picture area, see Patent 2,925,753.

Figure 11:
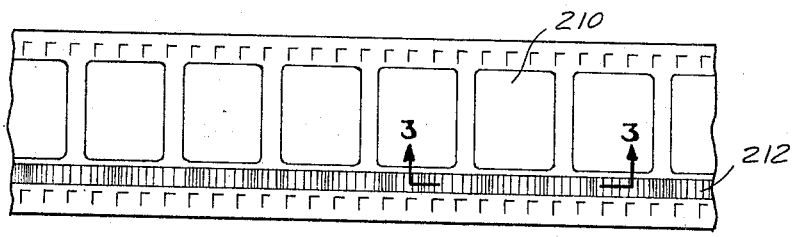
FIG. 11 is a section taken on line 3—3 of FIG. 3 of a strip of motion picture film bearing picture frames and superimposed sound tracks according to the invention.

FIG. 11 shows a strip of motion picture film, such as 35 mm. sound film, with picture areas 210 and sound track 212. The sound track is a three layer track of the kind shown in FIG. 3 as it is indicated in FIG. 11 by the section line 3—3.

While the invention has been described in detail with respect to certain now preferred examples and embodiments of the invention, it will be understood by those skilled in the art after understanding the invention, that various changes and modifications may be made without departing from the spirit and scope of the invention, and it is intended therefore to cover all such changes and modifications in the appended claims.

What is claimed as new and desired to be secured by Letters Patent is:

1. A recorder for recording simultaneously superimposed independent sound tracks on color film having a plurality of color layers each responsive to light of a different color, a plurality of light sources each having a color corresponding to that of a color responsive layer in the film, a light modulator receiving from each of said sources, beam splitting means for combining the modulated outputs from said light sources, and lens means receiving said combined modulated sources and focusing said sources on the corresponding layers in the film.

2. A recorder as claimed in claim 1, each of said modulators acting in response to an independent signal to be recorded.

3. A reproducer for simultaneously, independently and audibly reproducing a plurality of superimposed independent sound tracks recorded in separate color layers of a multiple layer color film, said reproducer comprising means for illuminating the sound track, beam splitting and light filter means for receiving light transmitted by said track and for separating said light into separate color images each of which corresponds in color to that of one layer of the color film, and a plurality of separate photocell sensors each of which is positioned to receive one of said separate color images.

References Cited by the Examiner
UNITED STATES PATENTS

| | | | |
|---|---|---|---|
| 2,005,847 | 6/1935 | Schmidt | 274—43 |
| 2,062,304 | 12/1936 | Gaspar | 352—5 |
| 2,066,880 | 1/1937 | Eissfedt | 274—5 |
| 2,084,947 | 6/1937 | Czeija et al. | 274—5 |
| 2,136,143 | 11/1938 | Michaelis | 179—100.3 |
| 2,176,303 | 10/1939 | Jones | 352—5 |
| 2,265,960 | 12/1941 | Woolf | 274—43 |

NORTON ANSHER, *Primary Examiner.*

CLIFFORD B. PRICE, *Assistant Examiner.*